United States Patent
Horiuchi (10) Patent No.: US 6,846,260 B2
(45) Date of Patent: Jan. 25, 2005

(54) AUTOMATIC TRANSMISSION

(75) Inventor: Tomofusa Horiuchi, Kanagawa (JP)

(73) Assignee: JATCO Ltd, Fuji (JP)

( * ) Notice: Subject to any disclaimer, the term of this patent is extended or adjusted under 35 U.S.C. 154(b) by 0 days.

(21) Appl. No.: 10/310,956

(22) Filed: Dec. 6, 2002

(65) Prior Publication Data

US 2003/0109346 A1 Jun. 12, 2003

(30) Foreign Application Priority Data

Dec. 7, 2001 (JP) ........................................ 2001-374441

(51) Int. Cl.$^7$ ............................................. F16H 31/00
(52) U.S. Cl. ...................... 475/125; 74/337; 73/118.1; 73/862.331; 73/862.334; 73/862.335
(58) Field of Search ................................ 475/125, 200, 475/206, 60, 266, 257; 74/337; 192/3.21, 3.29, 112; 73/118.1, 862.331, 862.334, 862.335

(56) References Cited

U.S. PATENT DOCUMENTS

| 2,603,109 | A | * | 7/1952 | Farkas et al. ................. 475/60 |
| 4,873,874 | A | * | 10/1989 | Sobel ..................... 73/862.333 |
| 4,887,461 | A | | 12/1989 | Sugimoto et al. |
| 4,949,821 | A | | 8/1990 | Murota et al. |
| 5,398,555 | A | * | 3/1995 | Ueno et al. ............. 73/862.326 |
| 5,442,966 | A | * | 8/1995 | Hase et al. ............. 73/862.335 |
| 5,526,704 | A | * | 6/1996 | Hoshina et al. ........ 73/862.335 |
| 5,589,645 | A | * | 12/1996 | Kobayashi et al. .... 73/862.335 |
| 6,260,421 | B1 | * | 7/2001 | Torbjornsson et al. . 73/862.331 |
| 6,524,216 | B2 | * | 2/2003 | Suzuki et al. .................. 477/3 |

FOREIGN PATENT DOCUMENTS

| JP | 63312551 A | * | 12/1988 | ............ F16H/5/58 |
| JP | 63312552 A | * | 12/1988 | ............ F16H/5/58 |
| JP | 1-021255 A | | 1/1989 | |

* cited by examiner

Primary Examiner—Charles A. Marmor
Assistant Examiner—David D. Le
(74) Attorney, Agent, or Firm—Foley & Lardner LLP

(57) ABSTRACT

In an automatic transmission having a torque converter with a pump impeller, a turbine runner, and a stator, a stator shaft is provided to support the stator on its outer periphery and to rotatably support a transmission input shaft on its inner periphery. A magnetostrictive torque sensor is provided to detect the magnitude of input torque transmitted to the transmission input shaft. The magnetostrictive torque sensor includes a magnetic material having a magnetostrictive property and attached onto the outer periphery of the transmission input shaft, and a cylindrical magnetic-property detector mounted on the inner periphery of the stator shaft and arranged to be opposite to the magnetic material to detect a change in a magnetic property of the magnetic material, occurring owing to the input torque applied to the transmission input shaft.

10 Claims, 4 Drawing Sheets

AUTOMATIC TRANSMISSION

TECHNICAL FIELD

The present invention relates to a torque sensor equipped automatic transmission, and specifically to the improved installation and layout of a magnetostrictive torque sensor that uses the magnetostrictive phenomena on automatic transmissions.

BACKGROUND ART

On automatic transmissions in passenger cars and trucks, to accurately automatically upshift or downshift, input torque transmitted from the output shaft (the crankshaft) of the engine to the transmission input shaft is often used as input informational data, in addition to the vehicle speed and throttle opening. In particular, on electronically controlled transmissions (ECT), the input torque data is often estimated based on engine speed. In this case, the transmission control performance tends to deteriorate owing to a slight deviation between the estimated input torque value and an actual torque value. To avoid this, a torque sensor is often mounted on the automatic transmission so as to directly measure or detect the input torque transmitted from the engine crankshaft to the transmission input shaft. It is difficult to satisfactorily install or lay out the torque sensor within a limited space of the automatic transmission. A poor installation or layout of the torque sensor on the automatic transmission, results in a change in the layout of the automatic transmission itself. This leads to a problem of increased total manufacturing cost.

SUMMARY OF THE INVENTION

A need therefore exists for an improved layout or installation of a magnetostrictive torque sensor on an automatic transmission for minimizing a change in the layout of the automatic transmission itself.

In order to accomplish the aforementioned and other objects of the present invention, an automatic transmission comprises a three-member torque converter comprising a pump impeller, a turbine runner, and a stator, a transmission input shaft to which the turbine runner is attached, a transmission mechanism that changes a transmission ratio to change input torque and input speed transmitted to the transmission input shaft, a stator shaft that supports the stator on an outer periphery and rotatably supports the transmission input shaft on an inner periphery, a magnetostrictive torque sensor that detects a magnitude of the input torque transmitted to the transmission input shaft, the magnetostrictive torque sensor comprising a magnetic material having a magnetostrictive property and attached onto an outer periphery of the transmission input shaft, and a cylindrical magnetic-property detector mounted on the inner periphery of the stator shaft and arranged to be opposite to the magnetic material to detect a change in a magnetic property of the magnetic material, occurring owing to the input torque applied to the transmission input shaft. The automatic transmission may further comprise an engine-driven oil pump mounted on the outer periphery of the stator shaft, and arranged between the torque converter and the transmission mechanism. The transmission input shaft has a portion that defines an axial central oil passage formed in the transmission input shaft and a portion that defines at least one radial oil passage formed in the transmission input shaft to supply hydraulic pressure from the oil pump through the radial oil passage to the axial central oil passage. The stator shaft has a portion that defines a communication oil passage formed in the stator shaft to supply the hydraulic pressure from the oil pump to the radial oil passage. Preferably, the magnetostrictive torque sensor is spaced axially away from the communication oil passage formed in the stator shaft so that the magnetostrictive torque sensor is axially offset from the communication oil passage toward a side of the torque converter, under a condition wherein the magnetostrictive torque sensor is mounted on the inner periphery of the stator shaft. Preferably, the automatic transmission may further comprise a torque-sensor retaining sleeve fitted to the inner periphery of the stator shaft for rotatably supporting the transmission input shaft by an inner periphery of the torque-sensor retaining sleeve and for preventing axial motion of the magnetostrictive torque sensor relative to the stator shaft to retain the magnetostrictive torque sensor at a predetermined installation position. More preferably, the torque-sensor retaining sleeve has a wiring-harness lead-through groove axially extending and formed in an outer periphery of the torque-sensor retaining sleeve to accommodate a part of a wiring harness of the magnetostrictive torque sensor in the wiring-harness lead-through groove. The automatic transmission may further comprise a sensor case accommodating therein the cylindrical magnetic-property detector. Preferably, a part of the sensor case is formed as an axially-extending protruded wiring-harness outlet port portion having a harness outlet port of the magnetic-property detector and a harness passage formed in the protruded wiring-harness outlet port portion. The protruded wiring-harness outlet port portion is fitted into the wiring-harness lead-through groove to intercommunicate the harness passage and the wiring-harness lead-through groove. Preferably, a torque-converter working-fluid passage is defined between the inner periphery of the stator shaft and the outer periphery of the transmission input shaft, so that the magnetostrictive torque sensor, comprising the magnetic material having the magnetostrictive property and attached onto the outer periphery of the transmission input shaft, and the magnetic-property detector mounted on the inner periphery of the stator shaft and arranged to be opposite to the magnetic material to detect the change in the magnetic property of the magnetic material, occurring owing to the input torque applied to the transmission input shaft, is disposed in the torque-converter working-fluid passage. More preferably, the stator shaft has a cylindrical recessed portion formed in the inner periphery of the stator shaft. The cylindrical recessed portion has an opening end facing the transmission mechanism, and has an inside diameter equal to an outside diameter of the magnetic-property detector and an axial depth measured from the opening end of the cylindrical recessed portion being equal to a depth that an axial end of the magnetic-property detector facing the transmission mechanism is axially offset from the communication oil passage formed in the stator shaft toward the side of the torque converter. The magnetic-property detector of the magnetostrictive torque sensor is accommodated in the cylindrical recessed portion. The torque-sensor retaining sleeve is fitted to the cylindrical recessed portion for rotatably supporting the transmission input shaft by the inner periphery of the torque-sensor retaining sleeve and for preventing axial motion of the magnetostrictive torque sensor relative to the stator shaft to retain the magnetostrictive torque sensor at the predetermined installation position. The torque-sensor retaining sleeve has an outside diameter equal to the inside diameter of the cylindrical recessed portion.

More preferably, the magnetic material has a specified zigzag pattern that is constructed by an intermediate induced magnetic anisotropy segment having an induced magnetic anisotropy of −45° with respect to the axial direction of the transmission input shaft, a first induced magnetic anisotropy segment having an induced magnetic anisotropy of +45° with respect to the axial direction of the transmission input shaft and located adjacent to and continuous with the intermediate induced magnetic anisotropy segment in such a manner as to extend from the intermediate induced magnetic anisotropy segment in one axial direction of the transmission input shaft, and a second induced magnetic anisotropy segment having an induced magnetic anisotropy of +45° with respect to the axial direction of the transmission input shaft and located adjacent to and continuous with the intermediate induced magnetic anisotropy segment in such a manner as to extend from the intermediate induced magnetic anisotropy segment in the opposite axial direction of the transmission input shaft. Preferably, the three adjacent induced magnetic anisotropy segments are deposited onto the outer periphery of the transmission input shaft. More preferably, a portion of the transmission input shaft including a magnetic-material deposited portion of the outer periphery of the transmission input shaft onto which the three adjacent induced magnetic anisotropy segments are deposited, is dimensioned to have a relatively smaller diameter than the other transmission input shaft portion including at least both shaft ends of the transmission input shaft.

The other objects and features of this invention will become understood from the following description with reference to the accompanying drawings.

DESCRIPTION OF THE PREFERRED EMBODIMENTS

Figure 1:
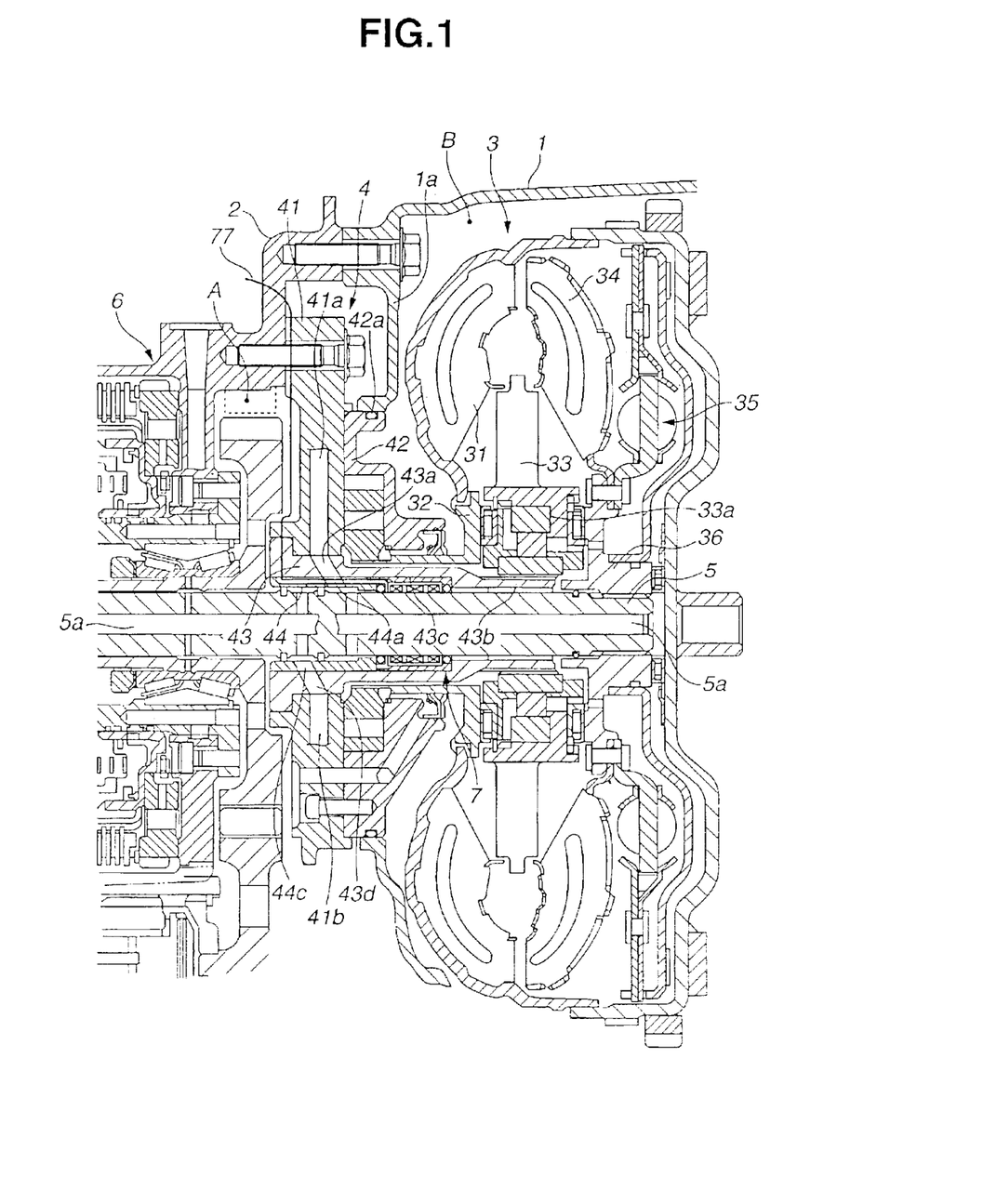
FIG. 1 is a longitudinal cross-sectional view illustrating one embodiment of a torque sensor equipped automatic transmission.

Referring now to the drawings, particularly to FIG. 1, the torque sensor equipped automatic transmission of the first embodiment is exemplified in an automatic transmission employing a torque-converter lock-up piston and a magnetostrictive torque sensor 7. As shown in FIG. 1, a transmission case 2 defines therein a first transmission-component-parts accommodating chamber A, whereas a converter cover 1 defines therein a second torque-converter accommodating chamber B. A transmission mechanism 6 is accommodated in first chamber A, whereas a three-member torque converter 3 is accommodated in second chamber B. Transmission mechanism 6 serves to change a transmission ratio and thus to change input torque and input speed transmitted to a transmission input shaft 5, and to transmit output torque (for example, increased torque) and output speed (for example, reduced speed) to drive wheels of an automotive vehicle. As may be appreciated from the left-hand cross section of FIG. 1, the automatic transmission shown of the first embodiment is a gear-type transmission, which uses planetary gearsets.

Figure 2:
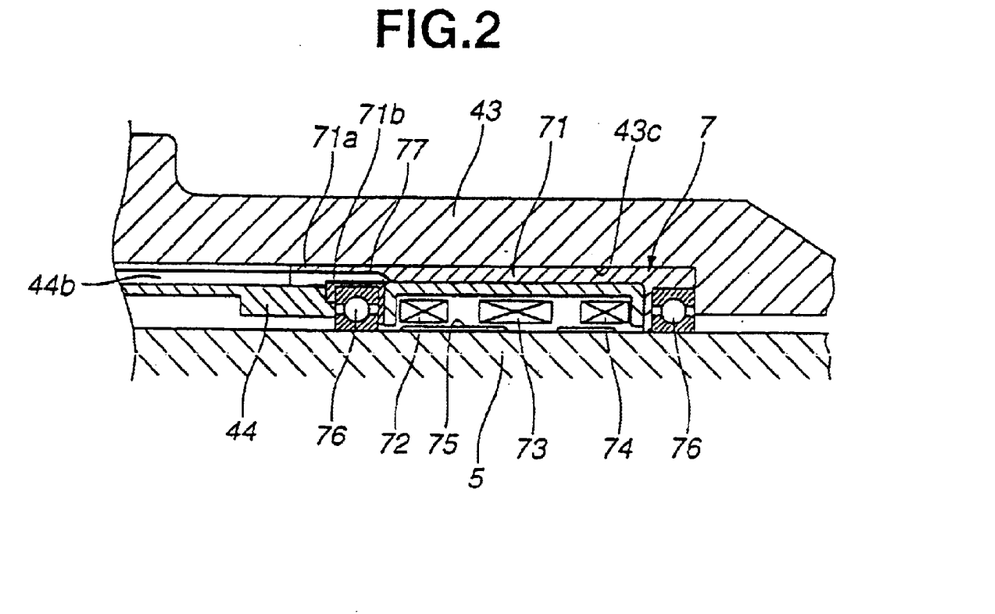
FIG. 2 is an enlarged cross-sectional view showing the installation portion of the torque sensor shown in FIG. 1.

The transmission mechanism itself is conventional and forms no part of the present invention, as will be fully described hereinafter, the fundamental concept of the invention may be applied to other types of automatic transmissions except a planetary-gear type automatic transmission, for example, a belt-drive continuously variable transmission and a toroidal continuously variable transmission. Three-member torque converter 3 is mainly comprised of a pump impeller (a driving member) 31, a stator 33, and a turbine runner (a driven member) 34. Pump impeller 31 is fixedly connected to an engine crankshaft so that the pump impeller rotates in synchronism with rotation of the crankshaft. Torque converter 3 is also formed with a drive hub portion 32 that is fixedly connected to the inner periphery of pump impeller 31 to drive the pump body of an oil pump assembly 4. Stator 33 is fixed onto a stator shaft 43. Turbine runner 34 is mechanically linked or attached via a torsion damper 35, disposed between the lock-up piston (not numbered) and a turbine hub 36, to transmission input shaft 5. Oil pump assembly 4 is arranged between the torque converter and the transmission mechanism, and constructed by a pump case 41, a pump cover 42, stator shaft 43 (also serving as an oil pump support on which the oil pump assembly is mounted), and a cylindrical-hollow torque-sensor retaining sleeve 44, in addition to the pump body driven by drive hub portion 32. Pump case 41 is bolted to transmission case 2. An oil seal 42a is interleaved between the inner periphery of a radially outwardly extending partition wall 1a of converter cover 1 and the outer periphery of pump cover 42 to provide the sealing action. Thus, first transmission-component-parts accommodating chamber A is separated from second torque-converter accommodating chamber B in a fluid-tight fashion. First chamber A serves as a wet chamber for oil lubrication, while second chamber B serves as a dry chamber with no oil lubrication. Transmission input shaft 5 has an axially extending central oil passage 5a. Pump case 41 has radial oil passages 41a and 41b formed therein. Pressurized hydraulic fluid is supplied from oil pump assembly 4 via radial oil passages 41a and 41b into central oil passage 5a. Stator shaft 43 has oblique communication oil passages 43a and 43d formed therein. The inlet port of oblique communication oil passage 43a communicates with radial oil passage 41a, whereas the inlet port of oblique communication oil passage 43d communicates with radial oil passage 41b. Stator shaft 43 is formed with a stator support 43b (see the right-hand end cylindrical-hollow portion of stator shaft 43 in FIG. 1) that supports stator 33 via a one-way clutch 33a. Stator shaft 43 is also formed with a cylindrical recessed portion 43c that accommodates therein both of torque-sensor retaining sleeve 44 and magnetostrictive torque sensor 7. In the torque sensor equipped automatic transmission of the first embodiment of FIG. 1, the leftmost end of magnetostrictive torque sensor 7, facing transmission mechanism 6, is spaced axially rightwards away from both of oblique communication oil passage 43a of stator shaft 43 and an oblique communication oil passage 44a (described later) of torque-sensor retaining sleeve 44 so that the leftmost end of magnetostrictive torque sensor 7 is axially offset rightwards from both of oblique communication oil passages 43a and 44a toward the side of torque converter 3, under a condition wherein magnetostrictive torque sensor 7 is inserted and installed into cylindrical recessed portion 43c of stator shaft 43. In order to more accurately measure or detect the magnitude of input torque transmitted from the engine crankshaft to transmission input shaft 5, it is more preferable to locate magnetostrictive torque sensor 7 substantially in a midpoint of transmission input shaft 5, rather than both ends of transmission input shaft 5. Torque-sensor retaining sleeve 44 has two oblique communication oil passages 44a and 44c therein. The outlet port of oblique communication oil passage 43a of stator shaft 43 communicates with oblique communication oil passage 44a of torque-sensor retaining sleeve 44, whereas the outlet port of oblique communication oil passage 43d of stator shaft 43 communicates with oblique communication oil passage 44c of torque-sensor retaining sleeve 44. Hydraulic pressure generated by oil pump assembly 4 is fed from radial oil passage 41a through oblique communication oil passages 43a and 44a to central oil passage 5a. In a similar manner, hydraulic pressure generated by oil pump assembly 4 is fed from radial oil passage 41b through oblique communication oil passages 43d and 44c to central oil passage 5a. As best seen in FIG. 2, torque-sensor retaining sleeve 44 has a wiring-harness lead-through groove (or a wiring-harness guide groove) 44b that accommodates therein a part of a wiring harness 77 of magnetostrictive torque sensor 7. Wiring-harness lead-through groove 44b axially extends and is formed in the outer periphery of torque-sensor retaining sleeve 44. As indicated by the thick, solid line in FIG. 1, wiring harness 77 can be easily led through wiring-harness lead-through groove 44b to the exterior of transmission case 2. Torque-sensor retaining sleeve 44 is press-fitted into cylindrical recessed portion 43c of stator shaft 43, in such a manner as to prevent axial motion of magnetostrictive torque sensor 7 relative to stator shaft 43 and to retain the torque sensor in place (at a predetermined installation position).

Figure 3:
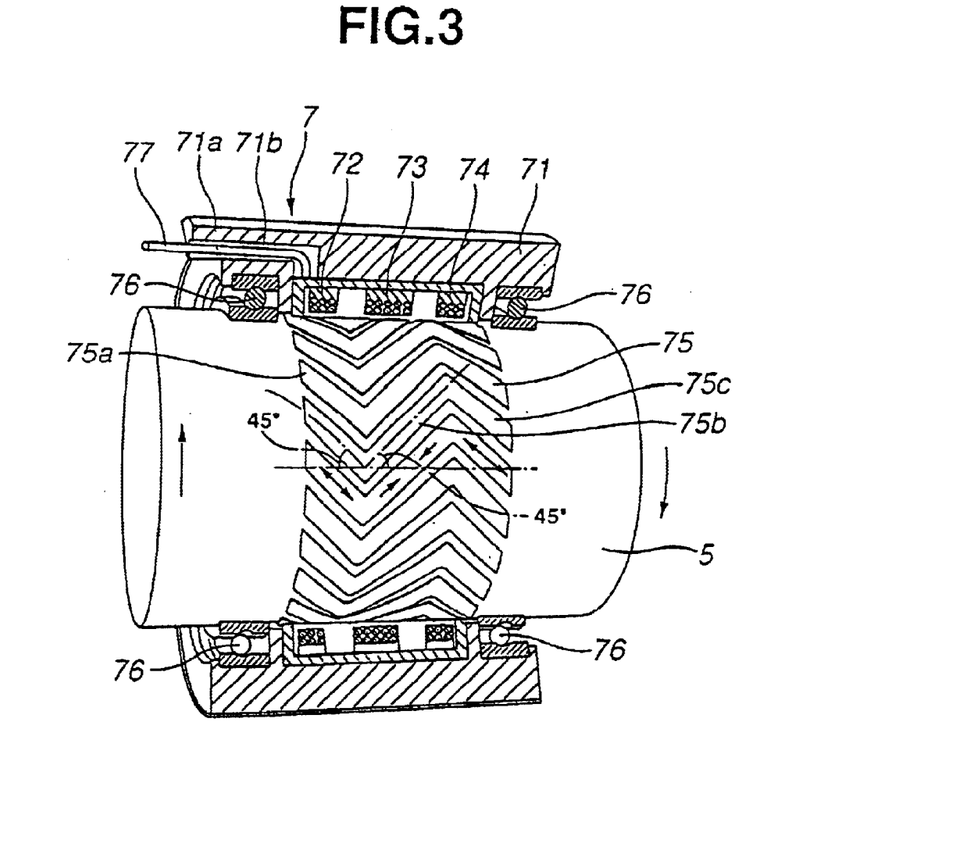
FIG. 3 is a perspective view showing the torque sensor shown in FIG. 1, partly cross-sectioned.

The detailed structure and layout of magnetostrictive torque sensor 7 is hereunder described in reference to the enlarged sections shown in FIGS. 2 and 3. As shown in FIGS. 2 and 3, magnetostrictive torque sensor 7 is comprised of a cylindrical-hollow sensor case 71, magnetic-property detecting coils 72, 73 and 74 serving as a cylindrical magnetic-property detector, a magnetic material 75, a pair of ball bearings 76, and wiring harness 77. A material having a magnetostrictive property is used as magnetic material 75. As described later by reference to the perspective view of FIG. 3, magnetic material 75 is attached onto the outer peripheral wall surface of an axial part of transmission input shaft 5, forming a specified pattern on the outer periphery of transmission input shaft 5. Ball bearing pair (76, 76) acts to rotatably support transmission input shaft 5. Ball bearing pair (76, 76) also serves as a radial spacer that sets or maintains the clearance between magnetic material 75 and each of magnetic-property detecting coils 72, 73 and 74 to a predetermined clearance. A part of sensor case 71, facing transmission mechanism 6, is formed as a protruded wiring-harness outlet port portion 71a, slightly extending axially leftwards from the annular, left-hand side wall of cylindrical-hollow sensor case 71. Protruded wiring-harness outlet port portion 71a of sensor case 71 has a harness outlet port of the magnetic-property detector and a harness passage 71b formed in the inner periphery of protruded wiring-harness outlet port portion 71a. Harness passage 71b communicates with wiring-harness lead-through groove 44b formed in torque-sensor retaining sleeve 44. As best seen in FIG. 2, the inner periphery of protruded wiring-harness outlet port portion 71a is fitted onto the outer periphery of torque-sensor retaining sleeve 44. As a consequence, the fitted-engagement between protruded wiring-harness outlet port portion 71a and torque-sensor retaining sleeve 44 contributes to relative positioning between torque-sensor retaining sleeve 44 and magnetostrictive torque sensor 7. As clearly shown in FIG. 3, magnetic material 75, attached onto the outer peripheral wall surface of transmission input shaft 5, has a specified zigzag pattern that is constructed by an intermediate induced magnetic anisotropy segment 75b, one side induced magnetic anisotropy segment 75a (a first induced magnetic anisotropy segment 75a) located adjacent to and continuous with intermediate induced magnetic anisotropy segment 75b in such a manner as to extend from intermediate induced magnetic anisotropy segment 75b in one axial direction of transmission input shaft 5, and the opposite side induced magnetic anisotropy segment 75c (a second induced magnetic anisotropy segment 75c) located adjacent to and continuous with intermediate induced magnetic anisotropy segment 75b in such a manner as to extend from intermediate induced magnetic anisotropy segment 75b in the opposite axial direction of transmission input shaft 5. Each of the first and second induced magnetic anisotropy segments 75a and 75c has an induced magnetic anisotropy of +45° with respect to the axial direction of transmission input shaft 5. In contrast to the above, intermediate induced magnetic anisotropy segment 75b has an induced magnetic anisotropy of −45° with respect to the axial direction of transmission input shaft 5. The axial length of intermediate induced magnetic anisotropy segment 75b is two times greater than that of each of the first and second induced magnetic anisotropy segments 75a and 75c. A plurality of magnetic materials 75, each of which is formed as a specified zigzag pattern by three adjacent induced magnetic anisotropy segments 75a, 75b and 75c continuous with each other, are circumferentially equidistant spaced and uniformly deposited on the outer periphery of a particular part of transmission input shaft 5 but around the entire circumference of the particular part of transmission input shaft 5. As clearly shown in FIG. 3, three adjacent induced magnetic anisotropy segments 75a, 75b and 75c are arranged to be opposite to the respective magnetic-property detecting coils 72, 73 and 74 in the radial direction of the transmission input shaft. As indicated by two arrows in the perspective view of FIG. 3, when applying torque, that is, a couple of forces having the same magnitude, parallel lines of action, and opposite sense to transmission input shaft 5, a strain takes place in transmission input shaft 5. Under application of the couple of forces, each of the first and second induced magnetic anisotropy segments 75a and 75c extends owing to tensile stress, while intermediate induced magnetic anisotropy segment 75b contracts owing to compressive stress. Magnetic material 75 has the magnetostrictive property, and therefore a magnetic property (a magnetic permeability) of magnetic material 75 changes due to the extended portions (first and second induced magnetic anisotropy segments 75a and 75c) and contracted portion (intermediate induced magnetic anisotropy segment 75b). The magnitude of input torque transmitted from the crankshaft to the transmission input shaft can be accurately detected or sensed by detecting or sensing by means of the magnetic-property detector, that is, magnetic-property detecting coils 72, 73 and 74.

In the torque sensor equipped automatic transmission of the first embodiment, magnetostrictive torque sensor 7 is installed on the inner periphery of stator shaft 43, and therefore it is possible to stably extract or detect input torque data transmitted from the engine to transmission input shaft 5 by means of magnetostrictive torque sensor 7. Additionally, magnetostrictive torque sensor 7 is spaced axially away from stator-shaft oblique communication oil passage 43a so that magnetostrictive torque sensor 7 is axially offset from oblique communication oil passage 43a toward the torque-converter side. Thus, it is possible to efficiently certainly supply hydraulic pressure from oil pump assembly 4 through stator-shaft oblique communication oil passage 43a to central oil passage 5a of transmission input shaft 5, without obstructing or blocking the working-fluid flow from the oil pump toward central oil passage 5a. That is, the axial offset of the magnetostrictive torque sensor from the communication oil passages avoids the torque sensor assembly itself from acting as a fluid-flow resistance and thus permits a smooth hydraulic pressure supply to the oil passages formed in the transmission input shaft. This insures stable speed-change control of the automatic transmission. According to the torque sensor equipped automatic transmission of the first embodiment, stator shaft 43 is also formed with cylindrical recessed portion 43c, and magnetic-property detecting coils 72, 73 and 74, cooperating with each other to provide the high-accuracy magnetic-property detector, are compactly accommodated in cylindrical recessed portion 43c. Furthermore, magnetostrictive torque sensor 7 is reliably retained at the predetermined axial position by press-fining of torque-sensor retaining sleeve 44 into stator-shaft cylindrical recessed portion 43c. As discussed above, in the torque sensor equipped automatic transmission of the first embodiment, stator shaft 43 has cylindrical recessed portion 43c formed in the inner periphery of the stator shaft. The cylindrical recessed portion 43c has an opening end facing transmission mechanism 6, and has an inside diameter equal to an outside diameter of the magnetic-property detector. Also, an axial depth measured from the opening end of cylindrical recessed portion 43c is dimensioned to be equal to a depth that the axial end of the magnetic-property detector facing transmission mechanism 6 is axially offset from communication oil passages 43a and 43d formed in the stator shaft toward the torque-converter side. The magnetic-property detector of the magnetostrictive torque sensor is accommodated in cylindrical recessed portion 43c. Thus, it is possible to reliably certainly mount the torque sensor on the automatic transmission while maintaining the clearance between the stator shaft and the transmission input shaft. Therefore, it is possible to install or mount certainly compactly magnetostrictive torque sensor 7 on the automatic transmission, while minimizing a change in the layout of the automatic transmission itself. Moreover, torque-sensor retaining sleeve 44 has axially-extending wiring-harness lead-through groove 44b formed in the outer periphery thereof. It is unnecessary to greatly change the layout of the automatic transmission itself owing to the wiring-harness layout of magnetostrictive torque sensor 7. Axially-extending wiring-harness lead-through groove 44b also serves as a harness protective guide for wiring harness 77. Wiring-harness lead-through groove 44b also, serving as a harness protective guide for wiring harness 77, is formed integral with torque-sensor retaining sleeve 44, and thus it is possible to reduce the number of component parts of the torque sensor equipped automatic transmission. Additionally, sensor case 71 has axially protruded wiring-harness outlet port portion 71a communicating with wiring-harness lead-through groove 44b of torque-sensor retaining sleeve 44, such that the inlet port portion of wiring-harness lead-through groove 44b conforms to axially protruded wiring-harness outlet port portion 71a of sensor case 71. Therefore, it is possible to prevent wiring harness 77 from being damaged owing to the edged opening end portion of the wiring-harness outlet port portion. In addition to the above, the inner periphery of axially protruded wiring-harness outlet port portion 71a of cylindrical-hollow sensor case 71 is fitted onto the outer periphery of torque-sensor retaining sleeve 44, thus ensuring accurate positioning between torque-sensor retaining sleeve 44 and magnetostrictive torque sensor 7 by preventing misalignment between the axis of the cylindrical-hollow torque-sensor retaining sleeve 44 and the axis of cylindrical-hollow sensor case 71.

Figure 4:
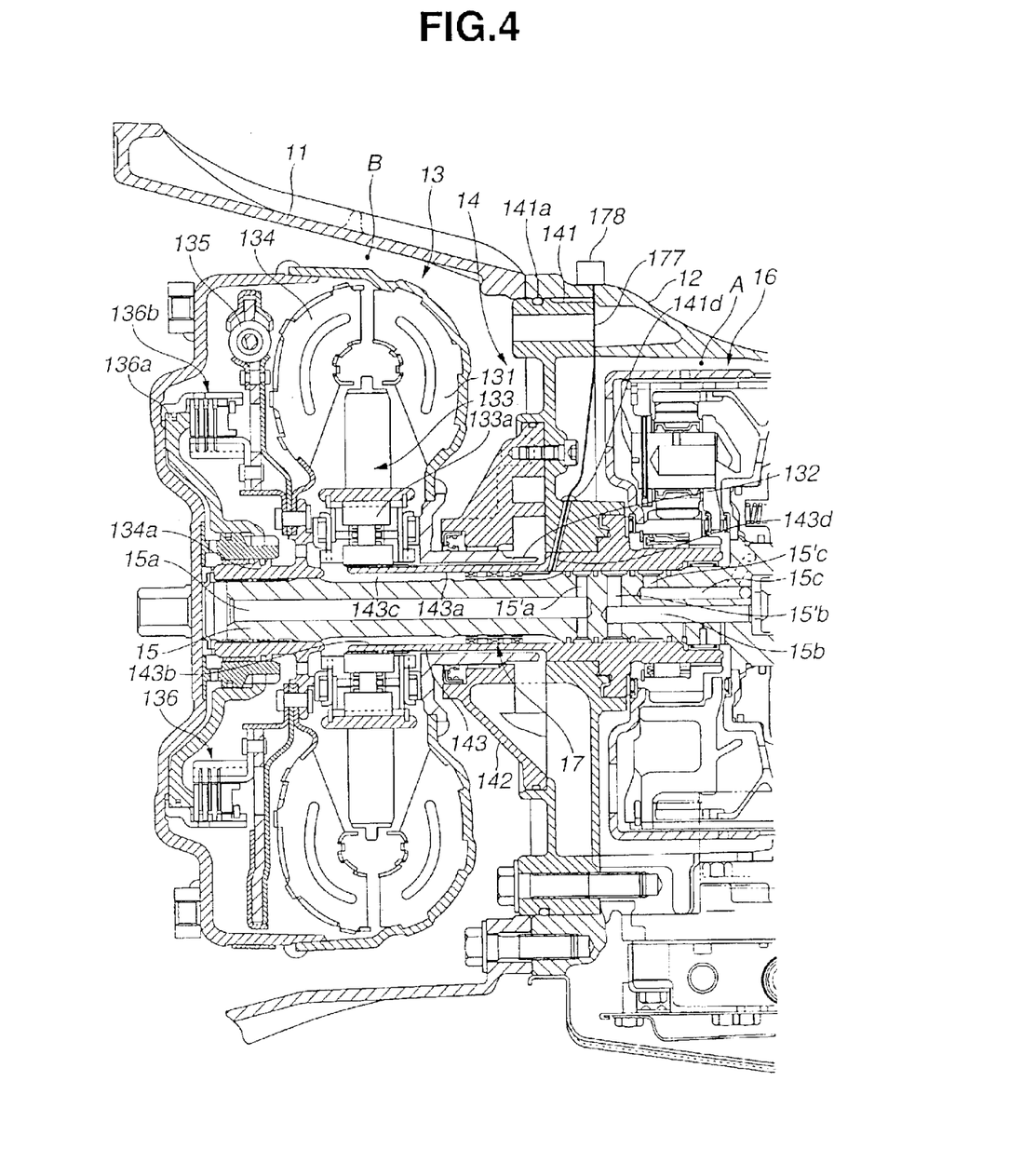
FIG. 4 is a longitudinal cross-sectional view illustrating another embodiment of a torque sensor equipped automatic transmission.
Figure 5:
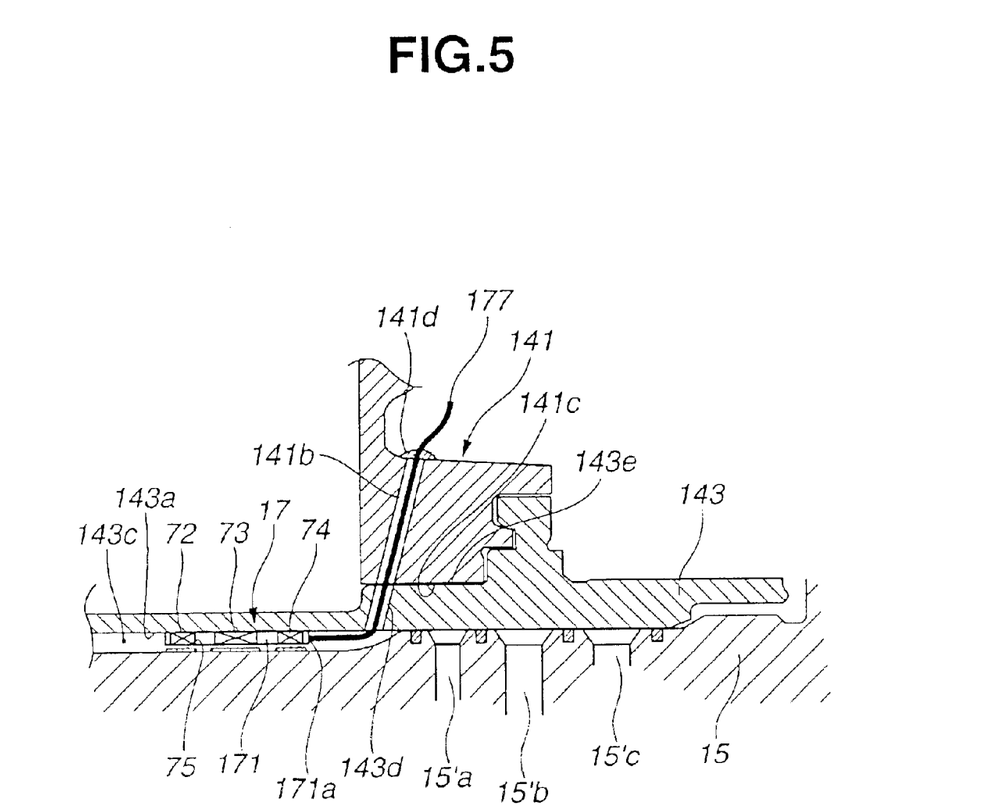
FIG. 5 is an enlarged cross-sectional view showing the installation portion of the torque sensor shown in FIG. 4.

Referring now to FIGS. 4 and 5, there is shown the torque sensor equipped automatic transmission of the second embodiment. The torque sensor equipped automatic transmission of the second embodiment is exemplified in an automatic transmission employing a torque-converter lock-up piston and clutch assembly 136 and a magnetostrictive torque sensor 17. As shown in FIG. 4, transmission case 12 defines therein a first transmission-component-parts accommodating chamber A, whereas a converter cover 11 defines therein a second torque-converter accommodating chamber B. A transmission mechanism 16 is accommodated in first chamber A, whereas a three-member torque converter 13 is accommodated in second chamber B. As may be appreciated from the right-hand cross section of FIG. 4, the automatic transmission shown of the second embodiment is a gear-type transmission, which uses planetary gearsets. The transmission mechanism itself is conventional and forms no part of the present invention, as will be fully described hereinafter, the fundamental concept of the invention may be applied to other types of automatic transmissions except a planetary-gear type automatic transmission, for example, a belt-drive continuously variable transmission and a toroidal continuously variable transmission. Three-member torque converter 13 is mainly comprised of a pump impeller 131, a stator 133, and a turbine runner 134. Pump impeller 131 is fixedly connected to an engine crankshaft so that the pump impeller rotates in synchronism with rotation of the crankshaft. Torque converter 13 is also formed with a drive hub portion 132 that is fixedly connected to the inner periphery of pump impeller 131 to drive the pump body of an oil pump assembly 14. Stator 133 is fixed onto a stator shaft 143. Turbine runner 134 is mechanically linked via a torsion damper 135, disposed between lock-up piston and clutch assembly 136 and a turbine hub 134a, to a transmission input shaft 15. Turbine hub 134a is fixedly connected or splined to transmission input shaft 5 in such a manner as to support turbine runner 134. Lock-up piston and clutch assembly 136 is comprised of a lock-up piston 136a and a lock-up clutch 136b. Lock-up piston 136a is mechanically linked onto the outer periphery of turbine hub 134a so that lock-up piston 136a is movable or slidable axially by way of the unbalanced pressures on the two sides of the lock-up piston. Lock-up clutch 136b is engaged by the pressure (or a push) created by axial sliding motion of lock-up piston 136a in the rightward direction (viewing FIG. 4) and as a result pump impeller 131 and turbine runner 134 are directly coupled to each other with the lock-up clutch engaged. Under such a transmission torque converter locked-up state, the engine torque output can be input from the crankshaft through the lock-up piston and clutch assembly 136 and turbine hub 134a to transmission input shaft 15 without any internal slippage (loss of energy) in the torque converter, and efficiently transferred to transmission mechanism 16 accommodated in first chamber A. Under a condition wherein lock-up piston 136a moves leftwards and is held at its initial position as shown in FIG. 4, lock-up clutch 136b is disengaged.

A pump case 141, a pump cover 142, and stator shaft 143, in addition to the pump body driven by drive hub portion 132 construct oil pump assembly 14. Pump case 141 is bolted to transmission case 12. An oil seal 141a is interleaved between the inner periphery of the opening end of transmission case 12, facing the torque converter, and the outer periphery of pump case 141 to provide the sealing action, and thus, first chamber A is separated from second chamber B in a fluid-tight fashion. First chamber A serves as a wet chamber for oil lubrication, while second chamber B serves as a dry chamber with no oil lubrication. Transmission input shaft 15 has an axial central oil passage 15a, two parallel axial oil passages 15b and 15c, and three radial oil passages 15'a, 15'b and 15'c formed therein. Although it is not clearly shown in FIG. 4, pump case 141 and stator shaft 143 have a plurality of oil passages formed in them, so as to supply the pressurized hydraulic fluid from oil pump assembly 14, via the plurality of oil passages formed in pump case 141 and stator shaft 143, through axial oil passages 15a, 15b and 15c, and radial oil passages 15'a, 15'b and 15'c formed in transmission input shaft 15, to engaging or applying elements such as clutches and brake bands. Stator shaft 143 is formed with a stator support 143b (see the left-hand end cylindrical-hollow portion of stator shaft 143 in FIG. 4) that supports stator 133 via a one-way clutch 133a. Stator shaft 143 is also formed therein an axially extending cylindrical-hollow portion 143a, which is formed integral with stator support 143b, so as to rotatably support transmission input shaft 15. Magnetostrictive torque sensor 17 is press-fitted into the inner periphery of cylindrical-hollow portion 143a. In the torque sensor equipped automatic transmission of the second embodiment of FIG. 4, the rightmost end of magnetostrictive torque sensor 17, facing transmission mechanism 16, is spaced axially leftwards away from all of radial oil passages 15'a, 15'b and 15'c of transmission input shaft 15 so that the rightmost end of magnetostrictive torque sensor 17 is axially offset leftwards from all of radial oil passages 15'a, 15'b and 15'c toward the torque-converter side, under a condition wherein magnetostrictive torque sensor 17 is press-fitted and installed into the inner periphery of stator-shaft cylindrical-hollow portion 143a. In more detail, magnetostrictive torque sensor 17 is disposed and located in a torque-converter working-fluid passage 143c defined between the outer periphery of transmission input shaft 15 and the inner periphery of stator-shaft cylindrical-hollow portion 143a. In order to more accurately measure or detect the magnitude of input torque transmitted from the engine crankshaft to transmission input shaft 15, it is more preferable to locate magnetostrictive torque sensor 17 substantially in a midpoint of transmission input shaft 15. The portion of transmission input shaft 15, which defines the above-mentioned torque-converter working-fluid passage 143c (having an annular lateral cross-section) in conjunction with the inner periphery of stator-shaft cylindrical-hollow portion 143a, is dimensioned to have a relatively smaller diameter than the other transmission input shaft portion containing at least both transmission input shaft ends. In other words, a portion of transmission input shaft 15 including a magnetic-material deposited outer peripheral wall surface is dimensioned to be relatively smaller in diameter.

The detailed structure and layout of magnetostrictive torque sensor 17 is hereunder described in reference to the enlarged section shown in FIG. 5. As shown in FIG. 5, magnetostrictive torque sensor 17 is comprised of a cylindrical-hollow sensor case 171, magnetic-property detecting coils 72, 73 and 74 serving as the magnetic-property detector, magnetic material 75, and a wiring harness 177. A material having a magnetostrictive property is used as magnetic material 75. A part of sensor case 171, facing transmission mechanism 16, is formed with a wiring-harness outlet port portion 171a. The structure of magnetostrictive torque sensor 17 of the second embodiment shown in FIGS. 4 and 5 is basically similar to that of magnetostrictive torque sensor 7 of the first embodiment shown in FIGS. 1–3. Thus, detailed description of the same structural features as the magnetostrictive torque sensor of the first embodiment will be omitted because the above description thereon seems to be self-explanatory. Only the different features concerning the structure and layout of magnetostrictive torque sensor 17 of the second embodiment are described hereunder described with reference to the accompanying drawings.

As can be appreciated from the enlarged cross section of FIG. 5, stator shaft 143 and pump case 141 are integrally connected or fitted to each other by fitting the outer peripheral fit surface 143e of stator shaft 143 into the inner peripheral fit surface 141c of pump case 141. As best seen in FIG. 5, an oblique harness passage 143d is bored or formed in stator shaft 143 in a manner so as to communicate torque-converter working-fluid passage 143c via oblique harness passage 143d to outer peripheral fit surface 143e. In a similar manner, an oblique harness passage 141b is bored or formed in pump case 141 in a manner so as to communicate inner peripheral fit surface 141c via oblique harness passage 141b to first chamber A. As indicated by the thick, solid line in FIGS. 4 and 5, wiring harness 177 of magnetostrictive torque sensor 17 can be easily led from wiring-harness outlet port portion 171a through torque-converter working-fluid passage 143c, and oblique harness passages 143d and 141b to the exterior of transmission case 12, and connected to a connector 178 mounted on the outer peripheral wall of transmission case 12. Additionally, a substantially annular aperture, which is defined between the outer periphery of wiring harness 177 and the opening end of oblique harness passage 141b communicating the internal space of first chamber A, is sealed in a fluid-tight fashion by way of a sealing material 141d.

With the previously-discussed arrangement, the magnetostrictive torque sensor equipped automatic transmission of the second embodiment can provide almost the same operation and effects as the first embodiment. That is, magnetostrictive torque sensor 17 is installed on the inner periphery of stator shaft 143, and therefore it is possible to stably extract or detect input torque data transmitted from the engine to the transmission input shaft 15 by means of magnetostrictive torque sensor 17. Additionally, magnetostrictive torque sensor 17 is spaced axially away from radial oil passages 15'a, 15'b and 15'c formed in transmission input shaft 15 so that magnetostrictive torque sensor 17 is axially offset from the radial oil passages toward the torque-converter side. Thus, it is possible to efficiently certainly supply hydraulic pressure from oil pump assembly 14 through radial oil passages 15'a, 15'b and 15'c to axial oil passages 15a, 15b and 15c formed in transmission input shaft 15, without obstructing or blocking the working-fluid flow from the oil pump toward the axial oil passages of transmission input shaft 15. Additionally, magnetostrictive torque sensor 17 can be certainly, reliably, and easily mounted on the stator shaft 143 without greatly changing the layout of the automatic transmission itself, by press-fitting sensor case 171 of magnetostrictive torque sensor 17 (including coils 72, 73 and 74) into the inner periphery of cylindrical-hollow portion 143a of stator shaft 143. When installing magnetostrictive torque sensor 17 on the automatic transmission, the portion of transmission input shaft 15, which defines torque-converter working-fluid passage 143c in conjunction with the inner periphery of stator-shaft cylindrical-hollow portion 143a, must be slightly small-sized in diameter in comparison with the other portion of transmission input shaft 15. Additionally, two oblique harness passages 143d and 141b must be bored or machined.

However, such machining for only the two oblique harness passages 143d and 141b and the relatively smaller-diameter transmission input shaft portion is easy. Easy machining contributes to reduced manufacturing costs of magnetostrictive torque sensor equipped automatic transmissions. Moreover, the relatively smaller-diameter transmission input shaft portion, which defines torque-converter working-fluid passage 143c in conjunction with the inner periphery of stator-shaft cylindrical-hollow portion 143a and includes a deposited magnetic-material zone on which magnetic materials 75 (three adjacent induced magnetic anisotropy segments 75a, 75b and 75c) are deposited, has a slightly smaller torsional rigidity than the other transmission input shaft portion. In other words, the relatively smaller-diameter transmission input shaft portion has a strain multiplying effect (or a stain increasing effect). Therefore, for the same amount of input torque (torsional force) applied, a tensile strain of each of first and second induced magnetic anisotropy segments 75a and 75c tends to remarkably increase, while a compressive strain of intermediate induced magnetic anisotropy segment 75b tends to remarkably decrease. That is, a change in the magnetostrictive property of magnetic material 75 becomes more remarkable and a sensitivity of the magnetic-property detector (magnetic-property detecting coils 72, 73 and 74) can be enhanced, thereby enhancing the detection accuracy of magnetostrictive torque sensor 17.

The entire contents of Japanese Patent Application No. P2001-374441 (filed Dec. 7, 2001) is incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An automatic transmission comprising:
    a torque convener comprising a pump impeller, a turbine runner, and a stator;
    a transmission input shaft to which the turbine runner is attached;
    a transmission mechanism that changes a transmission ratio to change input torque and input speed transmitted to the transmission input shaft;
    a stator shaft that supports the stator on an outer periphery and rotatably supports the transmission input shaft on an inner periphery;
    a magnetostrictive torque sensor that detects a magnitude of the input torque transmitted to the transmission input shaft; the magnetostrictive torque sensor comprising:
        (i) a magnetic material having a magnetostrictive property and attached onto an outer periphery of the transmission input shaft; and
        (ii) a cylindrical magnetic-property detector mourned on the inner periphery of the stator shalt and arranged to be opposite to the magnetic material to detect a change in a magnetic property of the magnetic material, occurring owing to the input torque applied to the transmission input shalt; and
    a torque-sensor retaining sleeve fitted to the inner periphery of the stator shaft, wherein the torque-sensor retaining sleeve is configured to prevent axial motion of the magnetostrictive torque sensor relative to the stator shaft to retain the magnetostrictive torque sensor at a predetermined installation position.

2. The automatic transmission as claimed in claim 1, further comprising:
    an engine-driven oil pump mounted on the outer periphery of the stator shaft, and arranged between the torque converter and the transmission mechanism; and wherein:
    the transmission input shaft has a portion that defines an axial central oil passage formed in the transmission input shaft and a portion that defines at least one radial oil passage formed in the transmission input shaft to supply hydraulic pressure from the oil pump through the radial oil passage to the axial central oil passage;
    the stator shaft has a portion that defines a communication oil passage formed in the stator shaft to supply the hydraulic pressure from the oil pump to the radial oil passage; and
    the magnetostrictive torque sensor is spaced axially away from the communication oil passage formed in the stator shaft so that the magnetostrictive torque sensor is axially offset from the communication oil passage toward a side of the torque converter, under a condition wherein the magnetostrictive torque sensor is mounted on the inner periphery of the stator shaft.

3. The automatic transmission as claimed claim 1, wherein:
    the torque-sensor retaining sleeve has a wiring-harness lead-through groove axially extending and formed in an outer periphery of the torque-sensor retaining sleeve to accommodate a part of a wiring harness of the magnetostrictive torque sensor in the wiring-harness lead-through groove.

4. The automatic transmission as claimed in claim 3, further comprising:
    a sensor case accommodating therein the cylindrical magnetic-property detector; and wherein:
    a part of the sensor case is formed as an axially-extending protruded wiring-harness outlet port portion having a harness outlet port of the magnetic-property detector and a harness passage formed in the protruded wiring-harness outlet port portion; and
    the protruded wiring-harness outlet port portion is fitted into the wiring-harness lead-through groove to intercommunicate the harness passage and the wiring-harness lead-through groove.

5. The automatic transmission as claimed in claim 1, wherein:
    a torque-converter working-fluid passage is defined between the inner periphery of the stator shaft and the outer periphery of the transmission input shaft; and
    the magnetostrictive torque sensor, comprising the magnetic material having the magnetostrictive property and attached onto the outer periphery of the transmission input shaft, and the magnetic-Property detector mounted on the inner periphery of the stator shaft and arranged to be opposite to the magnetic material to detect the change in the magnetic property of the magnetic material, occurring owing to the input torque applied to the transmission input shaft, is disposed in the torque-converter working-fluid passage.

6. The automatic transmission as claimed in claim 1, wherein:
    the stator shaft has a cylindrical recessed portion formed in the inner periphery of the stator shaft;
    the cylindrical recessed portion has an opening end facing the transmission mechanism, and has an inside diameter equal to an outside diameter of the magnetic-property detector and an axial depth measured from the opening end of the cylindrical recessed portion being equal to a depth that an axial end of the magnetic-property detector facing the transmission mechanism is axially offset from the communication oil passage formed in the stator shaft toward the side of the torque converter;

the magnetic-property detector of the magnetostrictive torque sensor is accommodated in the cylindrical recessed portion;

the torque-sensor retaining sleeve is fitted to the cylindrical recessed portion for rotatably supporting the transmission input shaft by the inner periphery of the torque-sensor retaining sleeve and for preventing axial motion of the magnetostrictive torque sensor relative to the stator shaft to retain the magnetostrictive torque sensor at the predetermined installation position; and the torque-sensor retaining sleeve has an outside diameter equal to the inside diameter of the cylindrical recessed portion.

7. The automatic transmission as claimed in claim 1, wherein:

the magnetic material has a specified zigzag pattern that is constructed by an intermediate induced magnetic anisotropy segment having an induced magnetic anisotropy of −45° with respect to the axial direction of the transmission input shaft, a first induced magnetic anisotropy segment having an induced magnetic anisotropy of +45° with respect to the axial direction of the transmission input shaft and located adjacent to and continuous with the intermediate induced magnetic anisotropy segment in such a manner as to extend from the intermediate induced magnetic anisotropy segment in one axial direction of the transmission input shaft, and a second induced magnetic anisotropy segment having an induced magnetic anisotropy of +45° with respect to the axial direction of the transmission input shaft and located adjacent to and continuous with the intermediate induced magnetic anisotropy segment in such a manner as to extend from the intermediate induced magnetic anisotropy segment in the opposite axial direction of the transmission input shaft.

8. The automatic transmission as claimed in claim 7, wherein:

the three adjacent induced magnetic anisotropy segments are deposited onto the outer periphery of the transmission input shaft.

9. The automatic transmission as claimed in claim 8, wherein:

a portion of the transmission input shaft including a magnetic-material deposited portion of the outer periphery of the transmission input shaft onto which the three adjacent induced magnetic anisotropy segments are deposited, is dimensioned to have a relatively smaller diameter than the other transmission input shaft portion including at least both shaft ends of the transmission input shaft.

10. An automatic transmission comprising:

a torque converter comprising a pump impeller, a turbine runner, and a stator;

a transmission input shaft to which the turbine runner is attached;

a transmission mechanism that changes a transmission ratio to change input torque and input speed transmitted to the transmission input shaft;

a stator shaft that supports the stator on an outer periphery and rotatably supports the transmission input shaft on an inner periphery;

a magnetostrictive torque sensor that detects a magnitude of the input torque transmitted to the transmission input shaft; the magnetostrictive torque sensor comprising:

(i) a magnetic material having a magnetostrictive property and attached onto an outer periphery of the transmission input shaft; and (ii) a cylindrical magnetic-property detector mounted on the inner periphery of the stator shaft and arranged to be opposite to the magnetic material to detect a change in a magnetic property of the magnetic material, occurring owing to the input torque applied to the transmission input shaft; and (iii) a wiring harness passage configured to contain a wiring harness that is connected with the torque sensor, wherein the wiring harness passage is obliquely shaped with respect to the stator shaft; and an engine-driven oil pump mounted on the outer periphery of the stator shaft, and arranged between the torque converter and the transmission mechanism, wherein:

the transmission input shaft has a portion that defines an axial central oil passage formed in the transmission input shaft and a portion that defines at least one radial oil passage formed in the transmission input shaft to supply hydraulic pressure from the oil pump through the radial oil passage to the axial central oil passage;

the stator shaft has a portion that defines a communication oil passage formed in the stator shaft to supply the hydraulic pressure from the oil pump to the radial oil passage;

the magnetostrictive torque sensor is spaced axially away from the communication oil passage formed in the stator shaft so that the magnetostrictive torque sensor is axially offset from the communication oil passage toward a side of the torque converter, under a condition wherein the magnetostrictive torque sensor is mounted on the inner periphery of the stator shaft.

* * * * *